(12) United States Patent
Bombeck

(10) Patent No.: US 11,998,135 B2
(45) Date of Patent: Jun. 4, 2024

(54) ADJUSTABLE TAMPER TOOL

(71) Applicant: Saint Anthony Industries, Ltd, Salt Lake City, UT (US)

(72) Inventor: Khristian Bombeck, Salt Lake City, UT (US)

(73) Assignee: Saint Anthony Industries LTD, Salt Lake City, UT (US)

(*) Notice: Subject to any disclaimer, the term of this patent is extended or adjusted under 35 U.S.C. 154(b) by 219 days.

(21) Appl. No.: 17/306,582

(22) Filed: May 3, 2021

(65) Prior Publication Data

US 2021/0345815 A1 Nov. 11, 2021

Related U.S. Application Data

(60) Provisional application No. 63/020,124, filed on May 5, 2020.

(51) Int. Cl.
*A47J 31/06* (2006.01)

(52) U.S. Cl.
CPC ................ *A47J 31/0663* (2013.01)

(58) Field of Classification Search
CPC ........ A47J 31/44; A47J 31/4403; A47J 31/06; A47J 31/3671; A47J 31/0663; A47J 31/00; A47J 31/0657; A47J 31/0631; A47J 31/24; A47J 31/38; A47J 36/02; A47J 43/28; A47J 47/16; A47G 19/2227; A47G 19/22; A47G 2400/04; B30B 1/00; B65D 1/06; B65D 23/00; B65D 41/04; B65D 51/245; B65D 85/72
USPC ................ 99/275, 279, 287, 302 R, 323
See application file for complete search history.

(56) References Cited

U.S. PATENT DOCUMENTS

2017/0280925 A1* 10/2017 Southern ................. A47J 31/44

OTHER PUBLICATIONS

Joung, KR 101756121 B1 (Year: 2017).*
Choi, KR 101710100 B1 (Year: 2017).*
Koh, KR 20180102759 (Year: 2018).*
Pyttel, DE 202013003598 U1 (Year: 2013).*
KR 102042056 B1 (Year: 2019).*

* cited by examiner

*Primary Examiner* — Vy T Nguyen
(74) *Attorney, Agent, or Firm* — Joseph E. Maenner; Maenner & Associates, LLC

(57) ABSTRACT

An adjustable coffee grounds tamper includes a top handle, a base threadingly connected to the top handle, and a middle ring disposed between the handle and the base and also threadingly connected to the base.

9 Claims, 2 Drawing Sheets

ADJUSTABLE TAMPER TOOL

BACKGROUND OF THE INVENTION

Field of the Invention

The invention relates to a tampering tool used to tamp coffee grounds in a coffee portafilter to pack the grounds to a desired tamp depth.

Description of the Related Art

Coffee drinkers tend to be pick about the flavor and strength of their coffee. Some drinkers may desire a weaker flavor, while other drinkers may desire a stronger flavor. The strength of coffee is determined by the amount of ground through which drinking water flows; the more grounds per unit volume, the stronger the coffee. To get more grounds per unit volume, coffee grounds are poured into a portafilter basket and then tamped to a desired depth to generate the desired amount of ground per unit volume.

It would be beneficial to provide a tampering tool that can tamper coffee grounds a desired tamp depth.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is an adjustable coffee grounds tamper that includes a top handle, a base threadingly connected to the top handle, and a middle ring disposed between the handle and the base and also threadingly connected to the base.

In an alternative embodiment, the present invention is an adjustable coffee grounds tamper comprising a top handle extending along a central longitudinal axis and having a blind passage having internal threads extending along the central longitudinal axis. A base having a threaded shaft is threadingly inserted into the blind passage. A middle ring is disposed between the handle and the base and is also threadingly connected to the threaded shaft.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
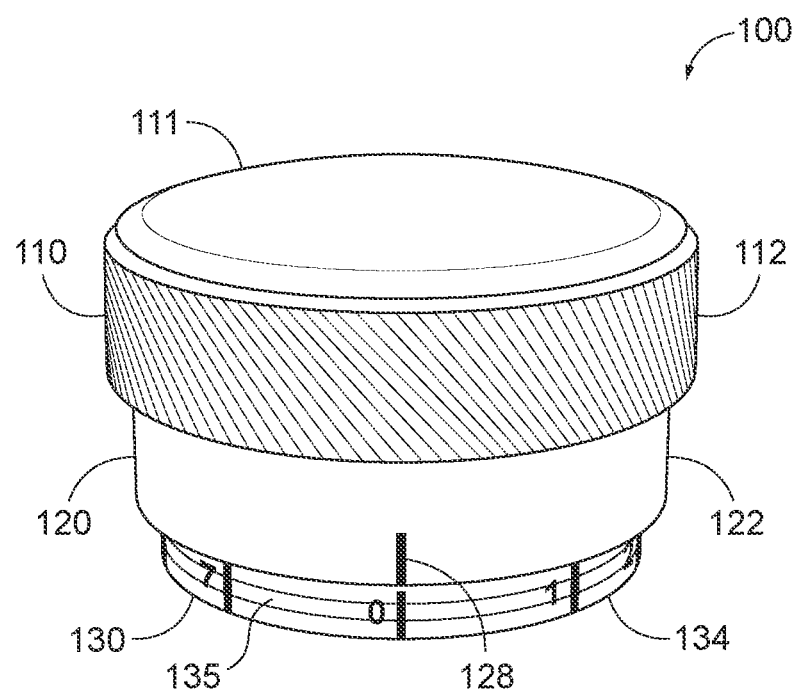
FIG. 1 is top perspective view of an adjustable coffee grounds tamper tool according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides a tamping tool that is used to tamp coffee grounds in a coffee portafilter to pack the grounds to a desired tamp depth. Coffee grounds can be poured into a portafilter prior to brewing a beverage, such as espresso. The inventive tamping tool can be indexed to a predetermined depth based on a user preference. A user can determine the ideal weight of ground coffee in his/her portafilter and rotate the tamping tool's center spacer to achieve the desired tamp depth of the coffee grounds.

Figure 2:
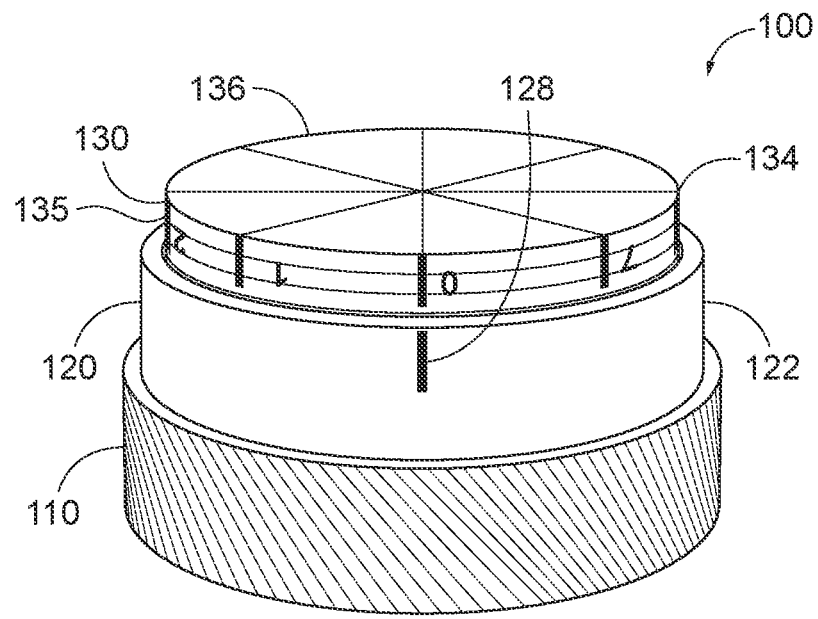
FIG. 2 is a bottom perspective view of the tamper tool of FIG. 1.
Figure 3:
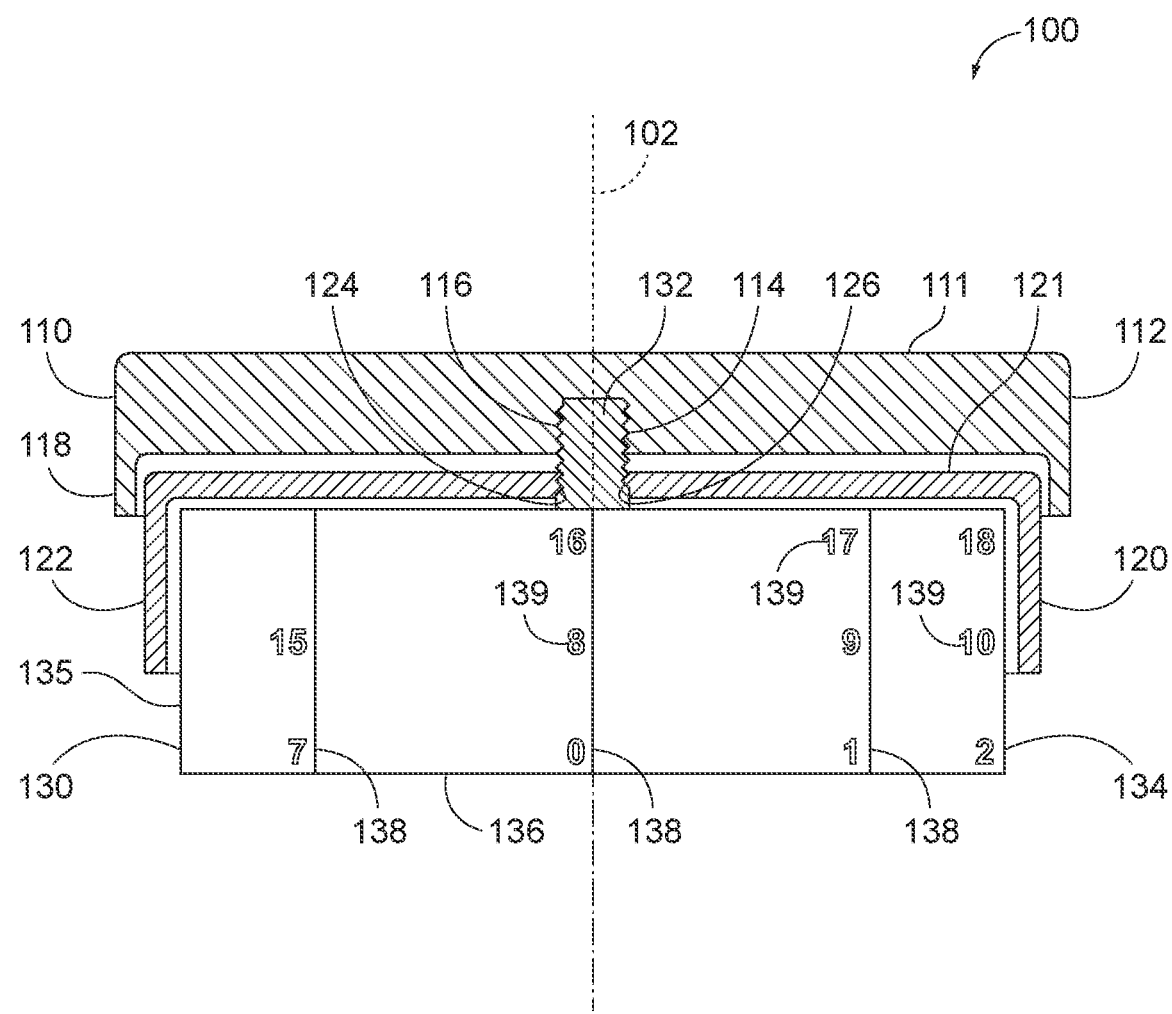
FIG. 3 is a sectional view of the tamper tool of FIG. 1.

Referring to FIGS. 1-3, a tamping too 100 ("tool 100") according to an exemplary embodiment of the present invention is shown. Tool 100 includes a top handle 110 that is threadingly connected to a base 130. A middle ring 120 is disposed between handle 110 and base 130 and is also threadingly connected to base 130.

Handle 110 has a generally circular body 111 that is sized to allow a user to comfortably grip handle 110 in the palm of a typical adult hand. Handle 110 can also include a knurled side wall 112 to assist a user in gripping handle 110. Referring to FIG. 3, handle 110 also includes a centrally located blind passage 114 with internal threads 116 to thread onto a threaded shaft 132 extending outwardly from base 130. Handle 110 can also include a circumferential lip 118 that circumscribes a top portion of middle ring 120.

Middle ring 120 has a generally circular body 121 with a cylindrical sidewall 122 extending downwardly therefrom. Sidewall 122 has a circumference to rest on top of a basket on a portafilter (not shown) so that base 130 extends into the basket to engage coffee grounds (not shown) in the basket and compress the coffee grounds a desired amount, as will be explained in detail below.

Body 121 also includes a centrally located through passage 124 with internal threads 126 to thread onto threaded shaft 132. Middle ring 120 also includes a single indicia 128 formed thereon as an indicator. Indicia 128 can be in the form of a vertical line or other suitable indicia.

Base 130 can be a solid cylindrical body 134, with threaded shaft 132 extending upwardly therefrom. Shaft 132 can be about 8 mm in diameter, with a 1.25 mm thread pitch, although those skilled in the art will recognize that the shaft diameter and thread pitch can be other values.

Base 130 has a cylindrical sidewall 135 ending in a tamping surface 136 that engages coffee grounds in a portafilter basket. FIG. 2 shows that tamping surface 136 is a generally flat surface that extends perpendicular to a central longitudinal axis 102 of tool 100. Those skilled in the art, however, will recognize that tamping surface 136 can extend oblique relative to longitudinal axis 102 such that, as tool 100 is rotated relative to the basket, the surface portion of tamping surface 136 distributes the coffee grounds evenly within the basket.

Base 130 also includes a plurality of indicia 138 that is spaced evenly around a perimeter of sidewall 135. Indicia 138 can be vertical lines, as shown in FIGS. 1 and 2, that can be aligned with single indicia 128 on middle ring 120 as base 130 is rotated relative to middle ring 120. Indicia 138 can also be identified by numerical values 139 that correspond to the amount of rotation of base 130 relative to middle ring 120.

Due to the pitch of threaded shaft 132, as base 130 rotates relative to middle ring 120, the amount of sidewall 135 extending away from middle ring 120 can be adjusted. For example, if eight indicia 138 are spaced around the perimeter of sidewall 135 and threaded shaft 132 has a pitch diameter of 1.25 mm, for each indicia 138 worth of rotation (⅛ of a full rotation), tamping surface 136 moves 1.25/8=0.156 mm relative to middle ring 120. A full rotation of base 130 relative to middle ring moves tamping surface 1.25 mm relative to middle ring 120. Numerical values 139 tell the user how much base 130 has been rotated relative to middle ring 120 so that the user can repeat desired alignments.

In an exemplary embodiment, tamping surface 136 can extend between about 5 mm and about 14 mm from middle ring 120, although those skilled in the art will recognize that tamping surface 136 can extend less than about 5 mm and more than about 14 mm from middle ring 120.

In an exemplary embodiment, middle ring 120 and base 130 can be constructed from stainless steel, although those skilled in the art will recognize that middle ring 120 and base 130 can be constructed form other materials as well. Handle 110 can be constructed from a hard wood, stainless steel, or other suitable material.

To use tool 100, handle 110 is unscrewed from threaded shaft 132 and removed. Base 130 is rotated a desired amount relative to middle ring 120 based on the coffee grounds being used, the desired strength of the coffee desired, and any other parameters that the user desires to incorporate into his/her preferences. When user has rotated base 130 a desired amount, the user can rethread handle 110 into threaded shaft 132 to act as a lock nut and secure middle ring 120 along threaded shaft 132 to retain the location of base 130 relative to middle ring 120.

The user places a desired amount of coffee grounds into a portafilter basket. The user then places tool 100 on top of the portafilter basket, allowing the bottom of sidewall 122 to rest on the top of the basket, with base 130 extending a desired distance into the basket. The user can then rotate tool 100 relative to the basket, evenly distributing and packing the coffee grounds into the basket. The user then removes tool 100 from the basket and places the basket into a brewing machine (not shown) to brew the coffee.

It will be further understood that various changes in the details, materials, and arrangements of the parts which have been described and illustrated in order to explain the nature of this invention may be made by those skilled in the art without departing from the scope of the invention as expressed in the following claims.

I claim:
1. An adjustable coffee grounds tamper comprising:
a top handle;
a base threadingly connected to the top handle, wherein the base comprises a plurality of indicia spaced evenly around an entire perimeter of a cylindrical sidewall of the base; and
a middle ring disposed between the top handle and the base and also threadingly connected to the base, wherein the middle ring comprises a cylindrical sidewall extending downwardly beyond a bottom of the top handle, wherein the cylindrical sidewall of the middle ring comprises a single indicia formed thereon as an indicator,
wherein the single indicia on the cylindrical sidewall of the middle ring is alignable with one of the plurality of indicia on the cylindrical sidewall of the base as the base is rotated relative to the middle ring,
wherein the top handle comprises a central longitudinal axis and a blind passage, wherein the blind passage of the top handle having internal threads extend along the central longitudinal axis,
wherein the base comprises a threaded shaft threadingly inserted into the blind passage of the top handle such that the top handle and the middle ring are threadingly connected to the threaded shaft of the base.

2. The adjustable coffee grounds tamper according to claim 1, wherein the middle ring includes a centrally located through passage with internal threads threaded onto the threaded shaft.

3. The adjustable coffee grounds tamper according to claim 1, wherein the base further comprises a tamping surface extending perpendicular to the central longitudinal axis.

4. The adjustable coffee grounds tamper according to claim 1, wherein the base further comprises a tamping surface extending oblique to the central longitudinal axis.

5. The adjustable coffee grounds tamper according to claim 1, wherein the top handle comprises a circumferential lip circumscribing a top portion of the middle ring.

6. An adjustable coffee grounds tamper comprising:

a top handle extending along a central longitudinal axis and having a blind passage having internal threads extending along the central longitudinal axis;

a base having a threaded shaft threadingly inserted into the blind passage, the base having a bottom tamping surface and a plurality of indicia evenly spaced around an entire perimeter of a cylindrical sidewall of the base; and a middle ring disposed between the top handle and the base, wherein the middle ring is also threadingly connected to the threaded shaft, wherein the middle ring comprises a cylindrical sidewall extending downwardly beyond a bottom of the top handle, wherein the cylindrical sidewall of the middle ring having a single indicia formed thereon, the single indicia configured to align with one of the plurality of indicia on the base as the base is rotated relative to the middle ring.

7. The adjustable coffee grounds tamper according to claim 6, wherein the middle ring is vertically adjustable between the top handle and the base.

8. The adjustable coffee grounds tamper according to claim 7, wherein vertical adjustment of the middle ring indexes to a predetermined depth based on a user preference.

9. The adjustable coffee grounds tamper according to claim 7, wherein the bottom tamping surface can extend between 5 mm and 14 mm from the middle ring.

* * * * *